United States Patent [19]

Usami

[11] Patent Number: 5,237,664

[45] Date of Patent: Aug. 17, 1993

[54] PIPELINE CIRCUIT

[75] Inventor: Kimiyoshi Usami, Kawasaki, Japan

[73] Assignee: Kabushiki Kaisha Toshiba, Kawasaki, Japan

[21] Appl. No.: 272,948

[22] Filed: Nov. 18, 1988

[30] Foreign Application Priority Data

Jan. 18, 1988 [JP] Japan .................. 63-7035

[51] Int. Cl.$^5$ .................................................. G06F 9/30
[52] U.S. Cl. ............................. 395/375; 364/DIG. 1;
364/231.8; 364/261.3; 364/261.5; 364/262.4;
364/263.0; 364/263.1; 364/263.2
[58] Field of Search ............... 364/200, 900; 395/375,
395/DIG. 1, DIG. 2

[56] References Cited

U.S. PATENT DOCUMENTS

| | | | |
|---|---|---|---|
| 3,881,173 | 4/1975 | Larsen et al. | 340/172.5 |
| 4,430,706 | 2/1984 | Sand | 395/375 |
| 4,435,756 | 3/1984 | Potash | 395/375 |
| 4,679,141 | 7/1987 | Pomerene et al. | 395/375 |
| 4,760,520 | 7/1988 | Shintani et al. | 395/375 |
| 4,827,402 | 5/1989 | Wada | 395/375 |
| 4,853,840 | 8/1989 | Shibuya | 395/375 |
| 4,858,104 | 8/1989 | Matsuo et al. | 395/375 |
| 4,870,573 | 9/1989 | Kawata et al. | 395/375 |
| 4,881,170 | 11/1989 | Morisada | 395/375 |
| 4,907,192 | 3/1990 | Kaneko | 395/375 |
| 4,974,154 | 11/1990 | Matsuo | 395/375 |
| 4,991,080 | 2/1991 | Emma et al. | 395/375 |

FOREIGN PATENT DOCUMENTS

| | | |
|---|---|---|
| 0162778 | 11/1985 | European Pat. Off. . |
| 0213301 | 3/1987 | European Pat. Off. . |
| 0219203 | 4/1987 | European Pat. Off. . |
| 573142 | 1/1982 | Japan . |
| 5848144 | 3/1983 | Japan . |

OTHER PUBLICATIONS

J. K. F. Lee, et al, Branch Prediction Strategies and Branch Target Buffer Design, "Computer", Jan., 1984, p. 6-22.

Primary Examiner—Michael R. Fleming
Assistant Examiner—Ayaz R. Sheikh
Attorney, Agent, or Firm—Foley & Lardner

[57] ABSTRACT

A pipeline circuit adopted for a CPU or a microprocessor in a computer system, computes the effective branch destination address of a conditional branch instruction before or in parallel with the execution of the conditional branch instruction, judges according to a result of the execution of an instruction just before the conditional branch instruction whether or not a branch condition of the conditional branch instruction is met, and, if the branch condition is met, executes the conditional branch instruction while prefetching and decoding an instruction located at the branch destination address.

4 Claims, 5 Drawing Sheets

PIPELINE CIRCUIT

BACKGROUND OF THE INVENTION

1. Field of the Invention

The present invention relates to a pipeline circuit adopted for a CPU or a microprocessor in a computer system. Particularly, the present invention relates to a pipeline circuit which computes the effective branch destination address of a conditional branch instruction before or in parallel with the execution of the conditional branch instruction, judges according to a result of the execution of an instruction just before the conditional branch instruction whether or not a branch condition of the conditional branch instruction is met, and, if the branch condition is met, executes the conditional branch instruction while prefetching and decoding an instruction located at the branch destination address.

2. Description of the Prior Art

To improve the processing speed of a microprocessor or a CPU in a computer system, various pipeline circuits have been developed.

Generally, the pipeline circuit decomposes a series of processes starting from an instruction fetching operation to an instruction executing operation into a plurality of steps, and processes the steps in separate circuit stages where the instruction is transferred from the first stage toward the last stage while being processed. According to the pipeline circuit, instructions are not processed one by one but processed in parallel with each other in the respective circuit stages.

FIG. 1 is a view showing an example of a pipeline circuit adopted for a CPU according to a prior art.

In the figure, a pipeline circuit 1 comprises an instruction fetching unit (IFU) 2, an instruction decoding unit (IDU) 3 and an instruction executing unit (EXU) 4.

The IFU 2 fetches an instruction from a memory 5, stores the same in an instruction buffer (not shown), and reads out an instruction stored in the instruction buffer to send the same to the IDU 3. The IDU 3 decodes the instruction supplied from the IFU 2 and sends a decoded instruction to the EXU 4. The EXU 4 executes the decoded instruction sent from the IDU 3.

FIG. 2 shows the processes carried out in the pipeline circuit 1 in handling an instruction A1 which is not a conditional branch instruction and a conditional branch instruction Bcc following the instruction A1.

For the sake of explanation,, an instruction fetching operation in the IFU 2 and a decoding operation in the IDU 3 are supposed to be carried out each within one clock cycle, and an effective destination address of the conditional branch instruction Bcc is supposed to be computed in the EXU 4.

The instruction A1 is fetched in a clock cycle T1, decoded in a clock cycle T2 and executed in clock cycles T3 to T5. In parallel with the execution of the instruction A1, the next conditional branch instruction Bcc is supplied to the IDU 3 in the clock cycle T2, decoded in the clock cycle T3 and executed in clock cycles T6 and T7.

The execution of the instruction Bcc includes judging (checking a flag) whether or not a branch condition of the instruction Bcc is met, computing a branch destination address of the instruction Bcc if the branch condition is met, etc.

If the branch condition is met, an instruction C1 located at the branch destination address is fetched in a clock cycle T8 and decoded and executed in clock cycles starting from T9.

As described in the above, when a conditional branch instruction is supplied to the pipeline circuit and if a branch condition of the branch instruction is met, prefetched instructions are abandoned, and an instruction located at a branch destination address starts to be fetched. Therefore, execution stage of the pipeline circuit waits for the completion of fetching and decoding the instruction located at the branch destination address so that the processing speed of a CPU including the pipeline circuit may be slowed.

To solve the problem of branch in the pipeline circuit, various pipeline circuits have been developed. However, they encountered other problems, in improving the processing time of conditional branching operation, e.g., increased amounts of hardware and complicated controls.

SUMMARY OF THE INVENTION

An object of the present invention is to provide a pipeline circuit which can improve the performance of a CPU without drastically increasing an amount of hardware and without complicating the controls.

In order to accomplish the object, the present invention provides a pipeline circuit comprising:

an instruction fetching unit for fetching an instruction code from a memory at an address specified by a program counter and storing the instruction code in an instruction buffer;

an instruction decoding unit for decoding an instruction code supplied from the instruction fetching unit, sending an effective address generating request and information related to an addressing mode to an effective address generating unit, detecting, if the decoded instruction is a conditional branch instruction, the value of a status flag fixed by the execution of a previous instruction, and, if a branch condition of the conditional branch instruction is met, notifying the effective address generating unit of the fact that the branch condition has been met;

an instruction executing unit for executing a decoded instruction supplied from the instruction decoding unit; and the effective address generating unit for receiving the effective address generating request and the information of addressing mode from the instruction decoding unit, reading a displacement out of the instruction buffer according to a request from the instruction decoding unit or from the effective address generating unit, computing an effective address according to the displacement, and setting the effective address in the program counter if a signal from the instruction decoding unit indicates that the branch condition has been met.

If the branch condition of the conditional branch instruction is met and after an instruction located at the branch destination address is prefetched, the instruction at the branch destination address and instruction following it are successively supplied to the decoding unit after the conditional branch instruction.

The pipeline circuit according to the present invention computes the effective branch destination address of a conditional branch instruction before or in parallel with the execution of the conditional branch instruction, judges according to a result of the execution of an instruction just before the conditional branch instruction whether or not a branch condition of the conditional branch instruction is met, and, if the branch condition is met, prefetches and decodes an instruction located a the branch destination address in parallel with the execution of the conditional branch instruction.

Therefore, the pipeline circuit of the present invention can improve the performance of a CPU or a microprocessor in a computer system without drastically increasing the amount of hardware and without complicating its controls.

These and other objects, features and advantages of the present invention will be more apparent from the following detailed description of preferred embodiments in conjunction with the accompanying drawings.

DETAILED DESCRIPTION OF THE PREFERRED EMBODIMENTS

Figure 1:
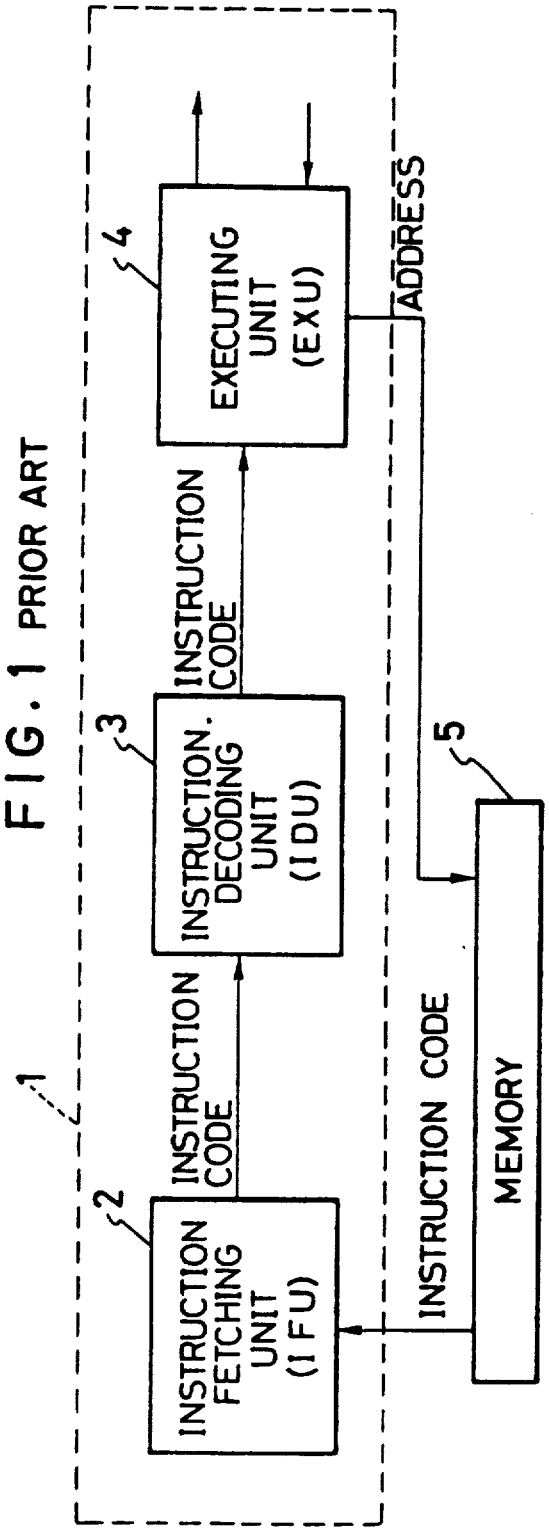
FIG. 1 is a block diagram showing a pipeline circuit according to a prior art.
Figure 2:
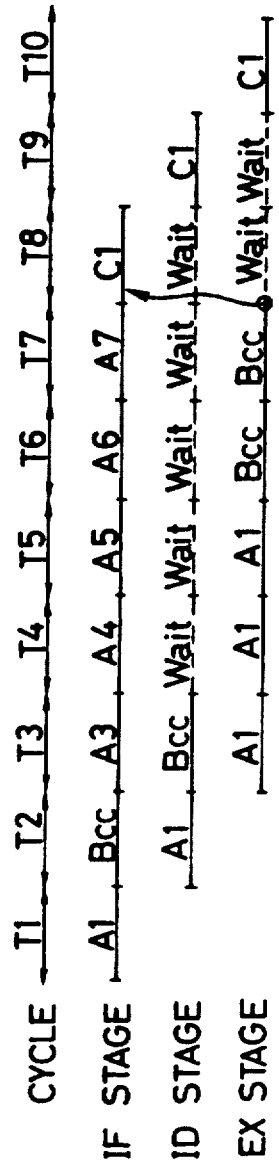
FIG. 2 is a timing chart showing processes carried out in the pipeline circuit of FIG. 1 in handling an instruction A1 which is not a conditional branch instruction and a conditional branch instruction Bcc following the instruction A1.
Figure 3:
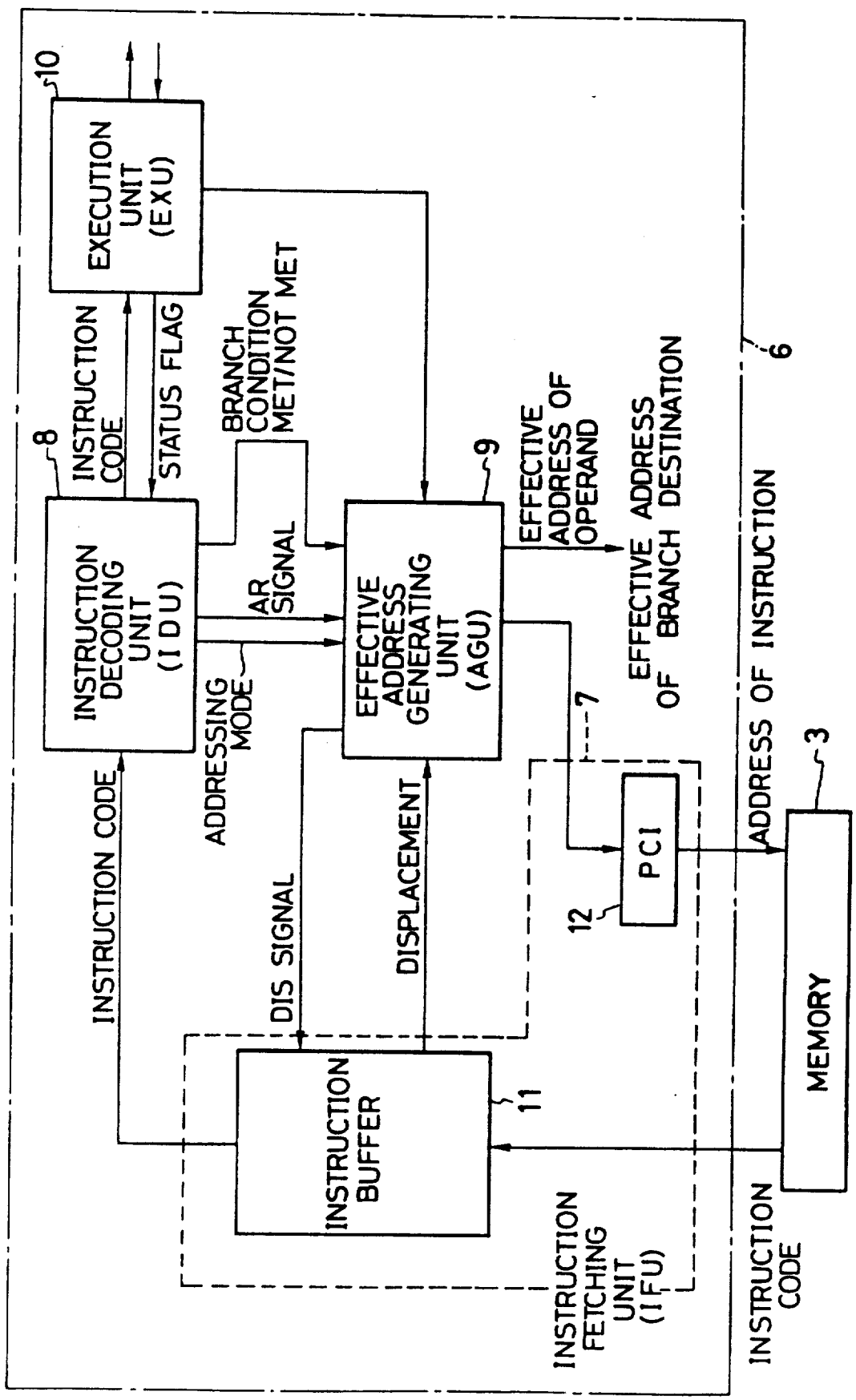
FIG. 3 is a block diagram showing a pipeline circuit according to an embodiment of the present invention.

FIG. 3 is a view showing a pipeline circuit according to an embodiment of the present invention.

A pipeline circuit 6 comprises an instruction fetching unit (IFU) 7, an instruction decoding unit (IDU) 8, an effective address generating unit (AGU) 9 and an executing unit (EXU) 10.

The IFU 7 fetches an instruction from a memory 3 according to an address set in a program counter PCI 12 and stores the instruction in an instruction buffer 11.

The address in the PCI 12 is incremented for every instruction fetching operation. As will be described later in detail, a branch destination address is set in the PCI 12 to branch the execution of a program.

Figure 4:
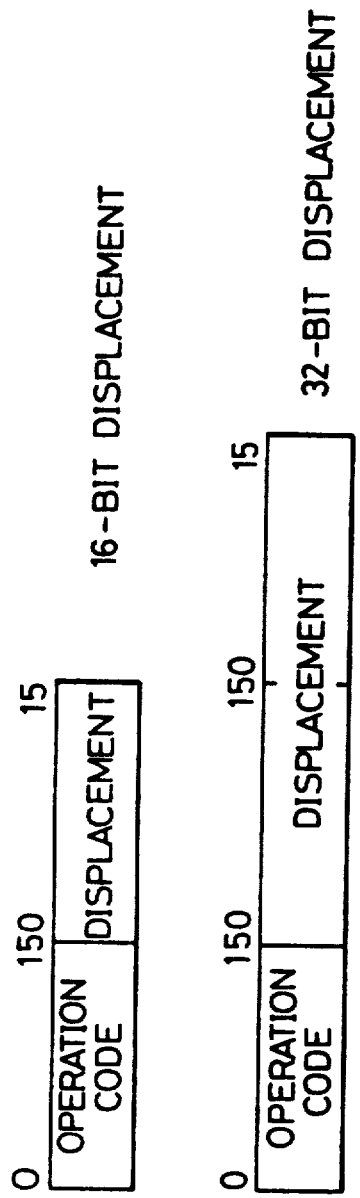
FIG. 4 is a view showing formats of instructions processed in the pipeline circuit of FIG. 3.

As shown in FIG. 4, an instruction code of this embodiment comprises an operation code of 16 bits including information related to an addressing mode, and a displacement of 16 or 32 bits.

Figure 6:
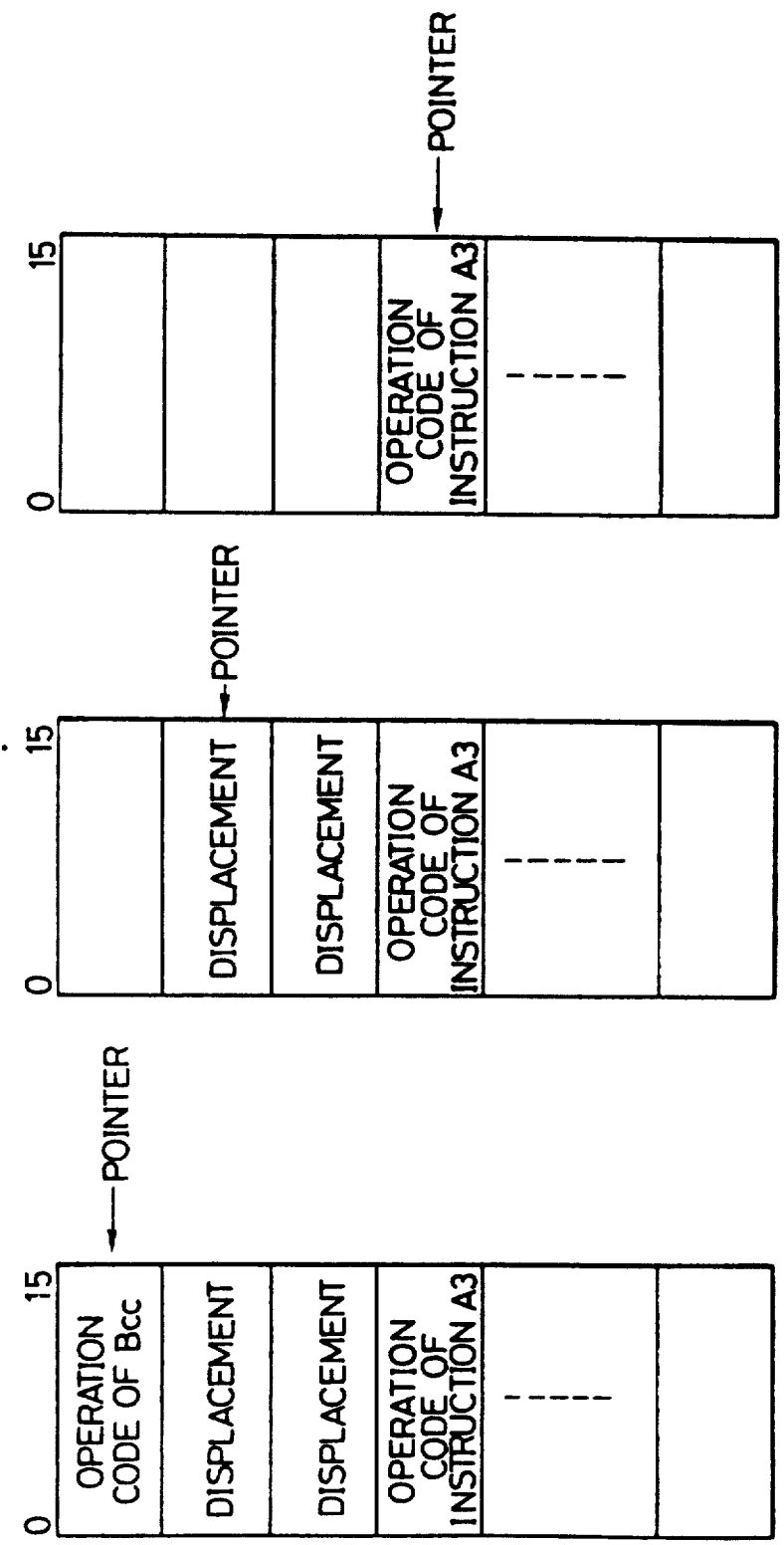
FIGS. 6(A), 6(B) and 6(C) are views showing the relation between a conditional branch instruction to be read out of an instruction buffer of the embodiment of FIG. 3 and a pointer.

As shown in FIG. 6, the instruction buffer 11 has a capacity of "16 bits × N words," and is read by word by word. The instruction buffer 11 has a pointer indicating the address of a word to be read next. The value of the pointer is incremented whenever the contents of the instruction buffer 11 are read out.

The IDU 8 decodes an instruction code supplied from the IFU 7. By decoding an operation code of the instruction, an addressing mode thereof is identified so that the IDU 8 may send an effective address generating request for an operand and information related to an addressing mode to the AGU 9.

If it is a conditional branch instruction, the IDU 8 sends, similar to the cases of other instructions, a request for generating an effective branch destination address and information related to an addressing mode to the AGU 9.

In addition, if it is the conditional branch instruction, an instruction just before the conditional branch instruction is executed to fix a status flag. After that, the IDU 8 detects the value of the status flag to judge whether or not a branch condition of the conditional branch instruction is met. If the branch condition is met, the IDU 8 notifies the AGU 9 of the fact that the branch condition has been met.

The AGU 9 determines an addressing mode based on the information of addressing mode supplied from the IDU 8. If there is a displacement, the AGU 9 sends a displacement sending request to the IFU 7, which then directly sends the displacement to the AGU 9.

Figure 7:
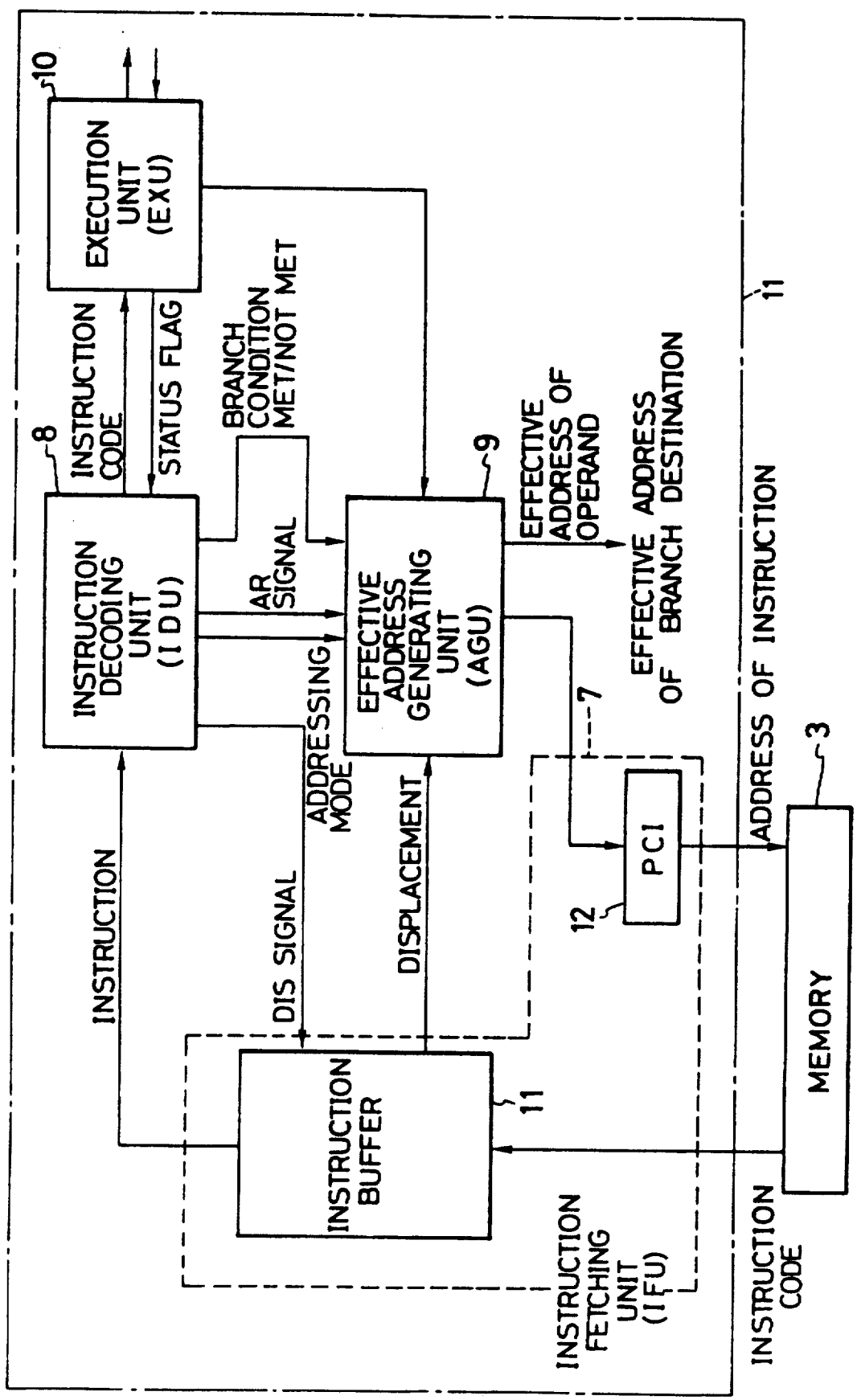
FIG. 7 is a block diagram showing a pipeline circuit modified from the pipeline circuit shown in FIG. 3.

Instead of outputting the displacement sending request from the AGU 9 to the IFU 7, it may be outputted from the IDU 8 to the IFU 7 as shown in FIG. 7.

When receiving the displacement from the IFU 7, the AGU 9 computes an effective address according to the addressing mode.

After computing the effective address, if a signal from the IDU 8 indicates that the branch condition has been met, the AGU 9 sets the effective address in the program counter (PCI) 12 of the IFU 7. Accordingly, the next instruction is prefetched from the branch destination address.

The EXU 10 fetches an operand from an effective address generated by the AGU 9 or writes an operand into the effective address in executing an instruction decoded by the IDU 8.

Figure 5:
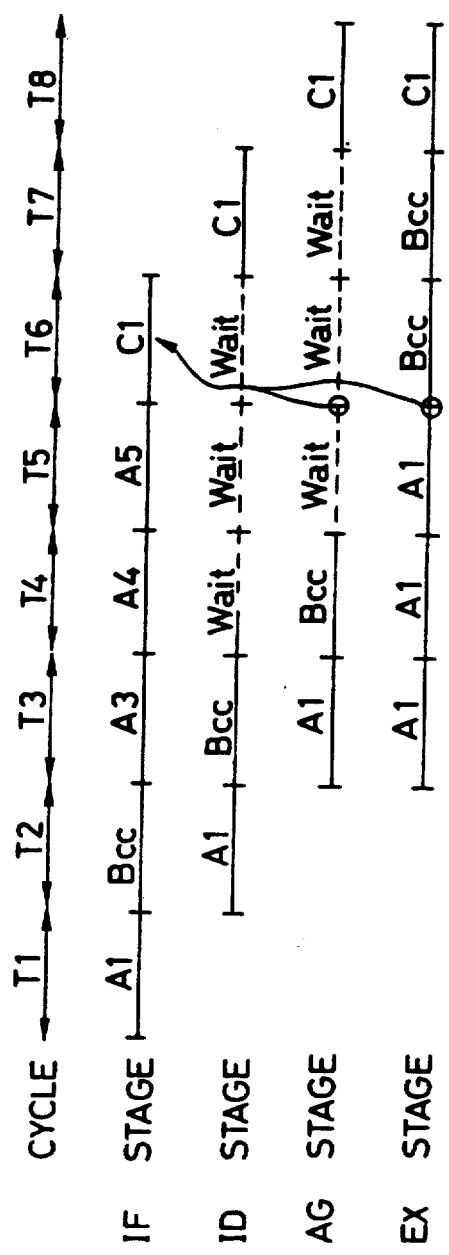
FIG. 5 is a timing chart showing processes carried out in the pipeline circuit of FIG. 3 in handling an instruction A1 which is not a conditional branch instruction and a conditional branch instruction Bcc following the instruction A1.

FIG. 5 shows the operation of the pipeline circuit 6. In the figure, the pipeline circuit 6 receives an instruction A1 which is not a conditional branch instruction and a conditional branch instruction Bcc following the instruction A1.

It is supposed that an instruction fetching operation and an instruction decoding operation are completed each within one clock cycle.

As shown in FIG. 5, the instruction A1 is fetched by the IFU 7 and stored in the instruction buffer 11 in a clock cycle T1, supplied to and decoded by the IDU 8 in a clock cycle T2, and computed for its effective address by the AGU 9 in a clock cycle T3. In addition, in the clock cycle T3, the execution of the instruction A1 is started by the EXU 10 and completed in a clock cycle T5.

The conditional branch instruction Bcc is prefetched in the clock cycle T2, decoded in the clock cycle T3, and computed for its branch destination address in the clock cycle T4. Even if the computation of the branch destination address is completed in the clock cycle T4, the execution of the instruction A1 will continue up to the clock cycle T5 so that a branch condition of the conditional branch instruction Bcc is not judged in the clock cycle T4. Therefore, in the clock cycle T5, the AGU 9 is in a waiting state and holds the branch destination address. In the clock cycle T5, the execution of the instruction A1 completes to fix a status flag. Then, the IDU 8 judges according to the status flag whether or not the branch condition of the conditional branch instruction Bcc is met.

If the branch condition is met, the branch destination address from the AGU 9 is set in the PCI 12. Therefore, in the next clock cycle T6, the execution of the instruction Bcc starts, while an instruction C1 located at the branch destination address is prefetched and stored in the instruction buffer 11. When the instruction C1 is fetched, a pointer of the instruction buffer 11 changes to indicate the fetched instruction C1. Therefore, in the next clock cycle T7, the instruction C1 is supplied to and decoded by the IDU 8. When the execution of the instruction Bcc is completed in the clock cycle T7, the instruction C1 starts to be executed and computed for its effective address in a clock cycle T8.

If the branch condition of the instruction Bcc is not met, the branch destination address held in the AGU 9 is not set in the PCI 12. Therefore, in the clock cycle T6, the instruction C1 located at the branch destination address is not fetched, but the next instruction is fetched from a current address in the PCI 12 (in FIG. 5, an address next to an address from which an instruction A5 has been fetched) and stored in the instruction buffer 11. Further, in the clock cycle T6, an instruction A3 next to the instruction Bcc is supplied from the instruction buffer 11 to the IDU 8 in which the instruction A3 is decoded.

If the number of execution cycles of an instruction just before a conditional branch instruction is small, a fact that a branch condition of the conditional branch instruction is not met may be found before the AGU 9 computes a branch destination address. In this case, the computation of the branch destination address is carried out to the end.

After the conditional branch instruction Bcc is decoded, a pointer of the instruction buffer 11 will indicate a displacement of the instruction Bcc as shown in FIG. 6(B). Therefore, the displacement of the instruction Bcc may be sent as the next instruction to the IDU 8 to cause an erroneous operation. To cope with this problem, the displacement of the instruction Bcc is read out of the instruction buffer 11 such that the pointer of the instruction buffer 11 will indicate an instruction next to the instruction Bcc as shown in FIG. 6(C).

Instead of computing the branch destination address to advance the pointer, it is possible to advance the pointer for the number of words of the displacement of the conditional branch instruction. However, according to this technique, controls shall be switched from one to another depending on whether a branch condition of the conditional branch instruction is found before the computation of the branch destination address or not. Therefore, the control of the instruction buffer 11 will be complicated.

As described in the above, the present invention can improve the performance of a CPU without drastically increasing an amount of hardware and without complicating controls.

The preferred embodiments of the present invention mentioned in the above are only illustrative and not intended to limit the scope of the present invention.

What is claimed is:

1. An information processing system for processing instructions according to a pipeline circuit, comprising:
   an instruction fetching unit for fetching an instruction from a memory;
   an instruction decoding unit connected to said fetching unit for decoding an instruction transferred from said fetching unit;
   an execution unit connected to said decoding unit for executing the instruction decoded by said decoding unit; and
   an address generating unit connected to said decoding unit and said fetching unit for calculating an effective address of the decoded instruction in response to an address calculation request transferred from said decoding unit; wherein
   said fetching unit includes a program counter for storing an address of an instruction to be fetched from said memory and an instruction buffer for storing a fetched instruction, said address generating unit being connected to said instruction buffer for calculating said effective address based on a displacement transferred from said instruction buffer when said displacement is used for the address calculation;
   said address generating unit starting calculation of a branch destination address when a conditional branch instruction has been decoded by said decoding unit;
   said branch destination being held by said address generating unit if it is not determined whether or not the branch condition is satisfied after said branch destination address is calculated by said address generating unit;
   when it is determined that the branch condition is satisfied, the branch destination address being set in said program counter so that the fetching operation of said branch destination instruction is carried out;
   when it is determined that the branch condition is not satisfied, said branch destination address not being set in said program counter so that the fetching operation of said branch destination instruction is not carried out; and
   when it is determined that the branch condition is not satisfied before completion of the calculation of said branch destination address, said branch destination address calculation is continued up to the end.

2. The pipeline circuit in a computer system as claimed in claim 1, in which a reading operation of instructions stored in the instruction buffer is controlled by a pointer which indicates a position of a data to be read next and is advanced by one word whenever a data is read out of the instruction buffer according to a readout request issued from said instruction decoding unit or from said effective address generating unit.

3. The pipeline circuit in a computer system as claimed in claim 1, in which the branch destination address of the conditional branch instruction is computed even if it is found, before said effective address generating unit computes the effective branch destination address of the conditional branch instruction, that the branch condition of the conditional branch instruction is not met.

4. The information processing system as claimed in claim 1 wherein said execution unit is connected with said address generating unit through said instruction decoding unit.

* * * * *